United States Patent
Jones et al.

(10) Patent No.: US 7,340,015 B1
(45) Date of Patent: *Mar. 4, 2008

(54) ASYMMETRIC WIRELESS PROTOCOL COMMUNICATIONS WHEREIN UPSTREAM TRAFFIC USES ONE PROTOCOL AND DOWNSTREAM TRAFFIC USES A DIFFERENT PROTOCOL

(75) Inventors: Vincent K. Jones, Redwood City, CA (US); Partho Mishra, Cupertino, CA (US); Greg Raleigh, Woodside, CA (US)

(73) Assignee: Qualcomm Incorporated, San Diego, CA (US)

( * ) Notice: Subject to any disclaimer, the term of this patent is extended or adjusted under 35 U.S.C. 154(b) by 711 days.

This patent is subject to a terminal disclaimer.

(21) Appl. No.: 10/643,215

(22) Filed: Aug. 18, 2003

(51) Int. Cl.
*H04B 7/10* (2006.01)
*H04Q 7/24* (2006.01)

(52) U.S. Cl. ................................ 375/347; 370/338

(58) Field of Classification Search ............... 375/264, 375/347, 225, 299; 370/208, 338, 204, 465, 370/455; 455/450
See application file for complete search history.

(56) References Cited

U.S. PATENT DOCUMENTS

| | | | |
|---|---|---|---|
| 6,725,015 B1* | 4/2004 | Lin | 370/338 |
| 7,062,703 B1* | 6/2006 | Keaney et al. | 714/807 |
| 2002/0013135 A1* | 1/2002 | Proctor, Jr. | 455/228 |
| 2003/0045307 A1* | 3/2003 | Arviv et al. | 455/464 |
| 2003/0210750 A1* | 11/2003 | Onggosanusi et al. | 375/295 |
| 2004/0125775 A1* | 7/2004 | Rios | 370/338 |

* cited by examiner

*Primary Examiner*—Khai Tran
(74) *Attorney, Agent, or Firm*—Amin, Turocy & Calvin, LLP

(57) ABSTRACT

In a wireless network, data transmitted from a client station to an access point is transmitted using the 802.11b protocol while data transmitted from the access point to the client station is transmitted using the 802.11g protocol. In an alternative embodiment of a wireless network, data transmitted from a client station to an access point is transmitted using the 802.11g protocol while data transmitted from the access point to the client station is transmitted using the 802.11b protocol.

23 Claims, 3 Drawing Sheets

ASYMMETRIC WIRELESS PROTOCOL COMMUNICATIONS WHEREIN UPSTREAM TRAFFIC USES ONE PROTOCOL AND DOWNSTREAM TRAFFIC USES A DIFFERENT PROTOCOL

BACKGROUND OF THE INVENTION

Wireless networks have become increasingly popular, as computers and other devices can be coupled for data communications without requiring wired connections between the network nodes. One set of standards for wireless networks is the IEEE 802.11 standards, but other wireless standards or protocols might be used instead. In the IEEE 802.11 standards, there are at least two widely-used standards, 802.11a and 802.11b, and communication systems and devices might be required to support both standards and/or be required to operate in areas where both are being used. Enhancements to the 802.11 standards have been in place, such as the 802.11g standard that allows for OFDM transmissions (802.11a is an OFDM transmission protocol) in the 2.4 GHz band.

The 802.11a protocol supports OFDM transmissions in the 5 GHz band for data rates of 6 to 54 million bits per second ("Mbps"). The 802.11b protocol supports DSSS transmissions in the 2.4 GHz band for data rates of 1, 2, 5.5 and 11 Mbps. The 802.11g protocol mixes OFDM and DSSS protocols in the 2.4 GHz band for data rates of 1, 2, 5.5, 6, 9, 11, 12, 18, 24, 36, 48 and 54 Mbps. Data transmissions are well known for these protocols, so they need not be set forth herein. They are described, for example, in ANSI/IEEE Std 802.11, 1999 Edition; IEEE Std 802.11b, 1999; IEEE Std 802.11a, 1999/Amd 1:2000(E). Those references are incorporated by reference herein for all purposes.

The 802.11b protocol can be supported by a station with a lower power than the full range of the 802.11g protocol. One reason for this is that the 1 to 11 Mbps transmissions can be at a lower signal-to-noise ratio (SNR) than the 12 to 54 Mbps transmissions. Another reason is that demodulation is simpler for DSSS than OFDM. Thus, where power limitations exist at a station, 802.11b might be used instead of 802.11g. Where a station is not power-limited and higher data rates are needed, the 802.11g protocol might be preferred, as data rates can be as high as 54 Mbps.

It would be desirable to overcome the shortcomings of the prior art described above.

BRIEF SUMMARY OF THE INVENTION

In one embodiment of a wireless network, data transmitted from one of an access point station and a client station to the other of the client station and the access point station is transmitted using the 802.11b protocol while data transmitted in the other direction is transmitted using the 802.11g protocol.

In some embodiments, data is sent with one protocol and acknowledgements are returned in the other protocol. Thus, the client station might send data in one protocol of 802.11b or 802.11g and the access point station acknowledges the data in the other protocol. Likewise, the access point station can send data in one protocol and receive acknowledgements in the other protocol.

A further understanding of the nature and the advantages of the inventions disclosed herein may be realized by reference to the remaining portions of the specification and the attached drawings.

DETAILED DESCRIPTION OF THE INVENTION

Figure 1:
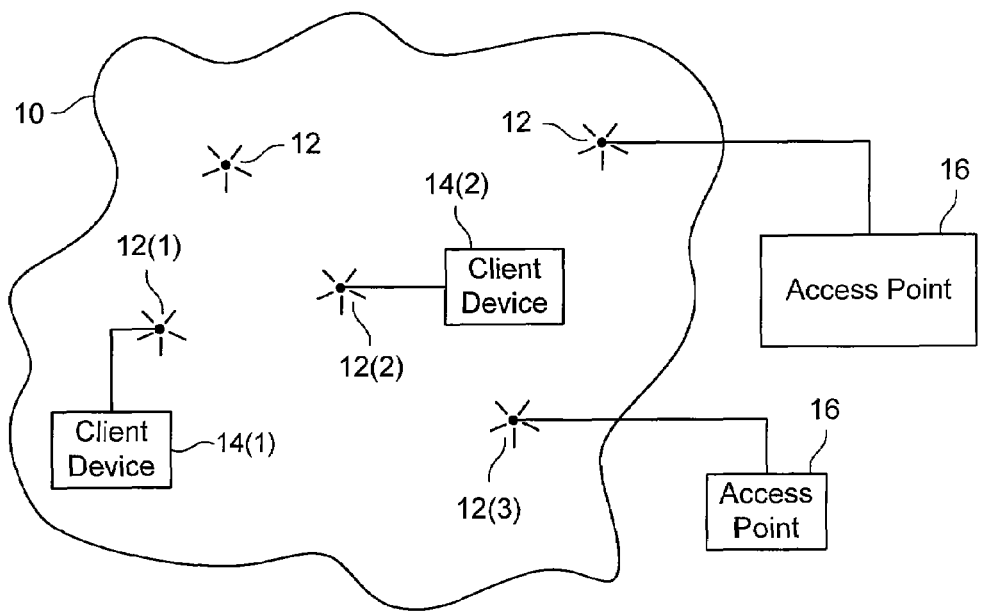
FIG. 1 is a block diagram of a simple wireless network that might use the present invention.

FIG. 1 illustrates a simple wireless network that might use the present invention. As shown in FIG. 1, a wireless network 10 comprises a plurality of stations 12 wherein each station 12 is capable of communicating with at least one other station 12 of wireless network 10. In specific implementations, wireless network 10 is a local area wireless network, as might be used within a building, campus, vehicle or similar environments.

In a specific embodiment, wireless network 10 is designed to be compliant with one or more of the IEEE 802.11 standards. However, it should be understood that other standards and nonstandard networks might be substituted therefore to solve problems similar to those solved in the 802.11 environment.

As shown, some of the stations are coupled to client devices 14, while other stations are coupled to wired network interfaces 16. For example, station 12(1) is coupled to client device 14(1), while station 12(3) is coupled to a wired network interface 16. FIG. 1 is intended to be a simplified and generalized diagram of a wireless network. Interfering signal generators are not shown, but are assumed to be present. More generally, wired network interfaces 16 might be instead replaced with other types of distribution systems as the invention is not limited to a particular interface.

Examples of client devices 14 include laptops, personal digital assistants (PDAs), or any other portable or semi-portable electronic device needing to communicate with other devices, or a stationary electronic device needing to communicate with other devices where a wired connection to a network or the other devices is not available or easily provided. Wired network interfaces 16 couple their respective stations to a network. Examples of such networks include the Internet, a local area network (LAN) or a public or private connection to a TCP/IP packet network or other packet network or networks.

In a typical operation, a plurality of client devices 14 are outfitted with circuitry and/or software that implements a station 12 functionality and one or more network access points are provided in wireless network 10 to provide access between such a client device and the network to which a wired network interface (or other distribution system) is coupled. A station coupled to a wired network interface or other distribution system is referred to as an "access point". Just one example of the uses of such a system is to connect computers within a building to a network without requiring network wires to be run to each computer. In that example, the building would be outfitted with stationary access points coupled to the network that are within wireless communication range of wireless network cards in each of the computers coupled to the network.

Figure 2:
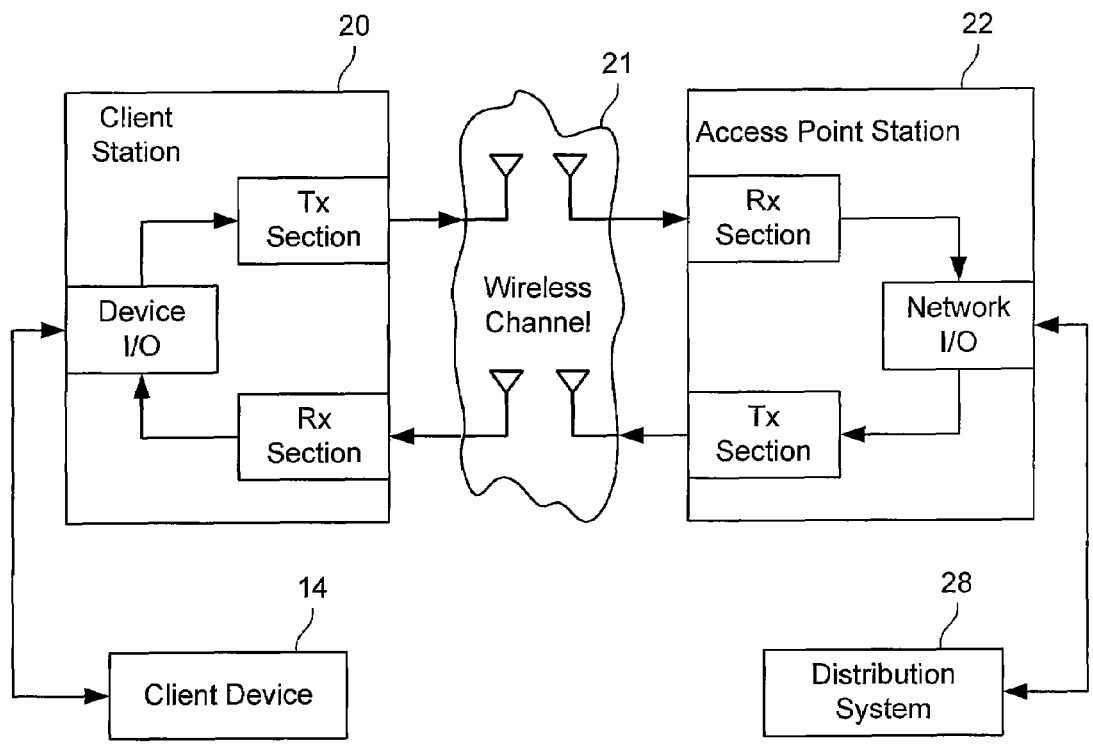
FIG. 2 is a block diagram illustrating the coupling between one device and one network connection of the wireless network shown in FIG. 1.

FIG. 2 shows in more detail the coupling between one client device and one distribution system. As shown there, client device 14 is coupled to a device I/O section of client station hardware 20. Client station hardware 20 includes a transmit section and a receive section, each coupled to the device I/O section. The transmit section transmits a signal through a wireless channel 21 to a receive section of access point station hardware 22. That receive section is coupled to a network I/O section, thus providing a data communication path from client device 14 to a distribution system 28. A path from distribution system 28 to client device 14 is also provided via the network I/O section of access point station hardware 22, a transmit section of access point station hardware 22, a receive section of client station hardware 20 and the device I/O section of client station hardware 20. The characteristics of wireless channel 21 depend on many factors, such as the location of client station hardware 20 and access point station hardware 22 as well as intervening objects, such as walls, buildings and natural obstructions, as well as influences by other devices and transmitters and receivers and signal-reflecting surfaces.

Typically, client station hardware 20 can be integrated in with client device 14. For example, where client device 14 is a laptop computer, client station hardware 20 might be an add-on PCMCIA card that is inserted into the laptop's PCMCIA slot. Access point station hardware 22 might be implemented as part of a wired network interface device that is just used to couple a wired network to a wireless network. Notwithstanding the typical implementation, it should be understood that nothing here prevents the diagram of FIG. 2 from being entirely symmetrical, i.e., wherein client station hardware 20 and access point station hardware 22 are nearly identical instances of hardware devices, however in many cases, a station that is an access point will be fixed and the station that is not an access point is in a portable or mobile device where power usage, cost, weight and/or size are considerations. Furthermore, communication is not limited to being between a client and an access point, as two clients can communicate and two access points can communicate.

Figure 3:
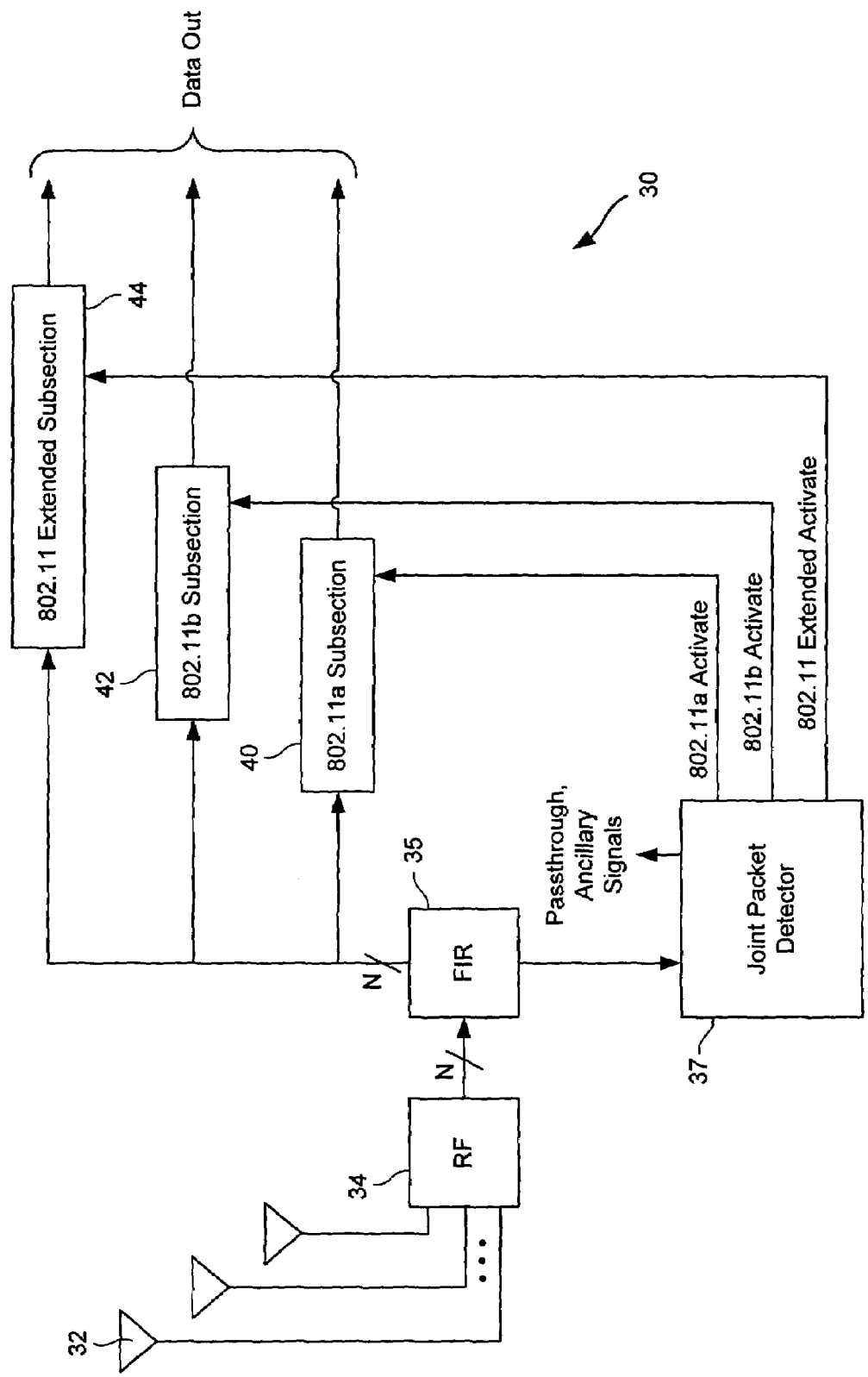
FIG. 3 is a block diagram of a receive section of station hardware as might be used in hardware illustrated in FIG. 2.

What follows is a detailed description of a receive section. FIG. 3 illustrates components of a receive section 30. Receive section 30 receives one or more signals over the wireless channel via antennas 32, which are initially processed by RF section 34. RF section 34 might, for example, process the signals to form baseband signals to form digital signal streams. As shown, receive section 30 also might include FIR(s) 35 and various subsections 40, 42, 44 for processing 802.11a, 802.11b and 802.11 extended signals, respectively. Further details of elements of receive section 30 not more fully described herein are shown in (U.S. patent application Ser. No. 10/068,360, filed on Feb. 5, 2002 on behalf of Steele et al. and entitled "Multi-Antenna Wireless Receiver Chain With Vector Decoding" and hereinafter "Steele", now abandoned), which is incorporated by reference herein for all purposes. It should be understood that the present invention is not limited to the particular receiver implementations shown here or there.

In the asymmetric modes described herein, transmission from a client station (e.g., a mobile and/or portable station) to an access point, in one direction is one protocol and in another direction is another protocol taking into account asymmetric bandwidth needs in each direction and/or taking into account asymmetric power, cost, weight and/or size limitations.

In a specific example, a client station sends data to an access point using the 802.11b protocol, while the access point sends data to the client station using the 802.11g protocol. Where most of the data flowing between the client station and the access point is flowing downstream from the access point to the client station, the network capacity is effectively the capacity of the 802.11g protocol with the range of the 802.11b protocol. One reason for this is because 802.11b works at lower SNR's due to the use of DSSS.

The 802.11g standard is a modification of the previous 802.11b standard that allows for additional, higher data rates. The 802.11b rates are 1, 2, 5.5 and 11 Mbps (four data rates), while the 802.11g rates are 1, 2, 5.5, 6, 9, 11, 12, 18, 22, 24, 33, 36, 48 and 54 Mbps (eleven data rates). For ease of reference, the 1, 2, 5.5 and 11 Mbps data rates are referred to herein as the "11b" rates and the 6, 9, 12, 18, 22, 24, 33, 36, 48 and 54 Mbps data rates are referred to herein as the "OFDM" rates. Note that where the OFDM rates can be used, higher data throughput is possible. However, under some less-than favorable conditions, an 11b rate is preferred over an OFDM rate as, for example, the data can be successfully transmitted using the 11b rates where the signal-to-noise ratios (SNRs) are low, as the required SNRs for 11b rates are lower than for higher rate OFDM rates.

This asymmetry has significant implications where one of the receivers is more sensitive than the other. For example, if two stations are not near each other, or there are other reasons why significant noise is introduced, a more sensitive receiver can receive at a higher data rate while transmitting to the less sensitive receiver at a lower data rate. The receiver might be more sensitive because it uses innovations such as those described in Steele (U.S. patent application Ser. No. 10/068,571, filed on Feb. 5, 2002 on behalf of van Nee et al. and entitled "System from Soft Symbol Decoding with MIMO Log-Map Detection" and hereinafter "van Nee", now abandoned), which is incorporated by reference herein for all purposes.

Where two sensitive receivers are used, they can both handle low SNRs. However, where one receiver, such as the receiver in a client device is more sensitive than the receiver in an access point, the access point can transmit using OFDM data rates while the client device transmits using 11b rates. This is advantageous especially where the data flow is greater towards the client device than away from the client device—a typical scenario where the client device is consuming information from a remote server via the wireless network. Since access points are typically stationary devices and client devices are typically mobile or portable devices, device size, power consumption, computing power, antenna positioning and reliability would be expected to be more constrained in a client device relative to an access point, which could lead to situations wherein a client device with a sensitive receiver would be in range for receiving OFDM transmissions while the less sensitive receiver at the other end might be out of range for receiving OFDM transmissions.

Figure 4:
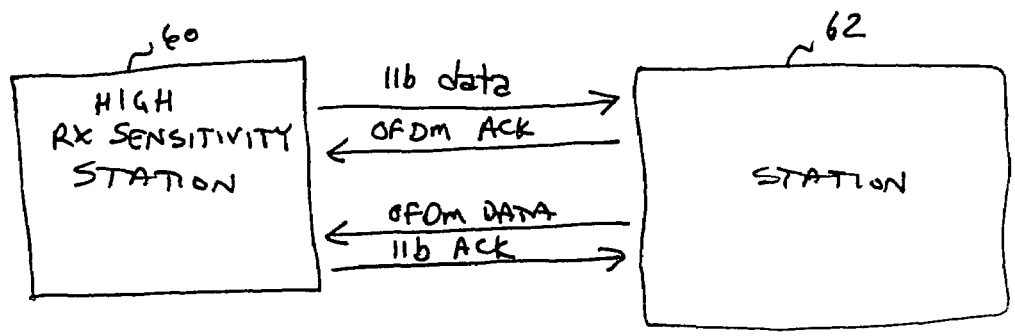
FIG. 4 is a block diagram illustrating data communication among two client devices.
Figure 5:
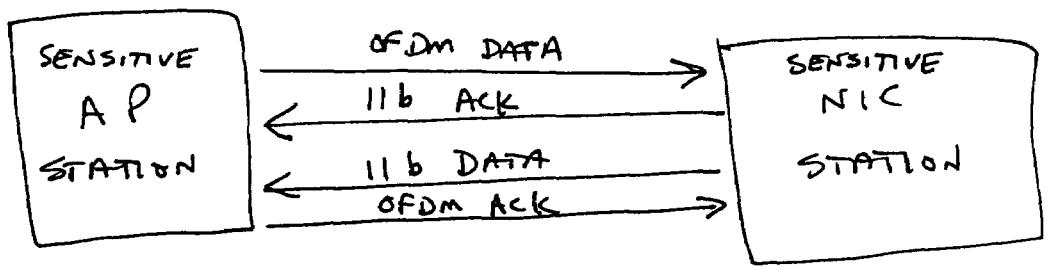
FIG. 5 is a block diagram illustrating data communication between an access point and a network interface card of a client device.

The advantages also apply when the access point has a sensitive receiver, for example, one designed by Airgo Networks, Inc. In such cases, the access point station transmits using an 11b data rate, to be received by a less sensitive network interface card (NIC) supporting a client device, rather than an OFDM data rate, but receives data from the NIC at an OFDM data rate. Acknowledgements ("ACKs") might be transmitted in a similar manner, as shown in FIG. 4. As shown there, a first station device 60 transmits to a second station device 62 using an 11b data rate while receiving ACKs at an OFDM data rate. When the second station device 62 transmits data, it does so at an OFDM data rate while receiving ACKs at an 11b data rate. In this example, first station device 60 can be either an access point station or a client device station and second station device 62 can also be either an access point station or a client device station—nothing here prevents two client devices or two access points from using these techniques to communicate among themselves.

Where two sensitive receivers are involved, such as two Airgo Networks devices, an asymmetry might still exist, such as a power constraint asymmetry. Assume, for example, that a sensitive access point is deployed and communications with a sensitive NIC and that the access point has a steady source of power, whereas the NIC is preferably a low-power device. This is desirable where the NIC draws power from a battery, such as the battery of a laptop, a cellular telephone, a PDA, or the like, where the battery must be carried or ported (so the size, and therefore the capacity of the battery is constrained). In such cases, 11b and OFDM rates might be used as indicated in FIG. 5.

The NIC-to-AP link budget is often less than the AP-to-NIC link budget due to the lower transmit power available for the NIC to spend, however that need not always be the case. Even where neither side is constrained in its use of transmit power, there are asymmetries. Some of these are due to, for example, variable transmit power, variable noise figure values for receiving radios and variable numbers of antennas used to increase receiver sensitivity.

Another source of asymmetry is that, for a given power amplifier, packets of 11b signals can be sent with more transmit power because they require less linearity than OFDM signals and thus can drive the power amplifier further in its dynamic range.

As described above, a sensitive access point and a less sensitive client device (such as an access point designed by Airgo and a client device using a station of another design), can benefit from the asymmetric transmissions described herein. Also, a sensitive access point with a sensitive client device with power constraints also benefits. Other cases might also benefit. For example, one station with high available transmit power and low receiver sensitivity (typically an access point, but not required) and another station (typically a client device station, but not required) with low available transmit power and high receiver sensitivity would also benefit from the asymmetric transmissions described herein. One situation where this is likely to be a common problem is where the client device is a personal digital assistant ("PDA"), which has very little transmit power available.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A client wireless module, for handling communications to and from an access point wireless module, comprising:
    an 802.11b processing section, for processing at least data to be transmitted to the access point wireless module into representations of a transmit signal and for processing at least a representation of a receive signal from the access point wireless module into receive data;
    an OFDM processing section, for processing at least a representation of a receive signal from the access point wireless module into receive data and for processing at least data to be transmitted to the access point wireless module into representations of a transmit signal;
    at least one transmit antenna, coupled to the 802.11b processing section and to the OFDM processing section;
    at least one receive antenna, coupled to the OFDM processing section and to the 802.11b processing section; and
    logic for routing information between a client and the client wireless module,
    wherein a transmit processing section to be used for processing the at least data to be transmitted is one of either the 802.11b or the OFDM processing sections, wherein the transmit processing section is defined at least in part upon one or more attributes of the client wireless module and one or more attributes of the access point wireless module,
    wherein the one or more attributes of the access point wireless module include a sensitivity of a receiver of the access point wireless module,
    wherein the one or more attributes of the client wireless module include a sensitivity of a receiver of the client wireless module,
    wherein if the receiver of the access point wireless module has a higher sensitivity than the sensitivity of the receiver of the client wireless module, the OFDM processing section is selected as the transmit processing section and,
    wherein if the receiver of the access point wireless module has a lower sensitivity than the sensitivity of the receiver of the client wireless module, the 802.11b processing section is selected as the transmit processing section.

2. The client wireless module of claim 1, wherein the at least one transmit antenna comprises a plurality of transmit antennas.

3. The client wireless module of claim 1, wherein the at least one receive antenna comprises a plurality of receive antennas.

4. A client wireless module, for handling communications to and from an access point wireless module, comprising:
    an OFDM processing section, for processing at least data to be transmitted to the access point wireless module into representations of a transmit signal and for processing at least a representation of a receive signal from the access point wireless module into receive data;
    an 802.11b processing section, for processing at least a representation of a receive signal from the access point wireless module into receive data and for processing at least data to be transmitted to the access point wireless module into representations of a transmit signal;
    at least one transmit antenna, coupled to the OFDM processing section and to the 802.11b processing section;
    at least one receive antenna, coupled to the 802.11b processing section and to the OFDM processing section; and
    logic for routing information between a client and the client wireless module,
    wherein a receive processing section to be used for processing the at least a representative of a receive signal is one of either the OFDM processing section or the 802.11b processing sections, wherein the receive processing section is defined at least in part upon one or more attributes of the client wireless module and one or more attributes of the access point wireless module, wherein the one or more attributes of the access point wireless module include a transmitter strength of a transmitter of the access point wireless module, wherein the one or more attributes of the client wireless module include a transmitter strength of a transmitter of the client wireless module, wherein if the transmitter strength of the transmitter of the access point wireless module has a higher transmitter strength than the strength of the transmitter of the client wireless module the OFDM processing section is selected as the receive processing section, and wherein if the transmitter of the access point wireless module has a lower transmitter strength than the transmitter strength of the client wireless module, the 802.11b processing section is selected as the receive processing section.

5. The client wireless module of claim 4, where in the at least one transmit antenna comprises a plurality of transmit antennas.

6. The client wireless module of claim 4, wherein the at least one receive antenna comprises a plurality of receive antennas.

7. An access point wireless module, for handling communications to and from a client wireless module, comprising:

an 802.11b processing section, for processing at least data to be transmitted to the client wireless module into representations of a transmit signal and for processing at least a representation of a receive signal from the client wireless module into receive data;

an 802.11g processing section, for processing at least a representation of a receive signal from the client wireless module into the receive data and for processing at least data to be transmitted to the client wireless module into representations of a transmit signal;

at least one transmit antenna, coupled to the 802.11b processing section and to the 802.11b processing section;

at least one receive antenna, coupled to the 802.11g processing section and to the 802.11g processing section; and logic for routing information between an access point and the access point wireless module, wherein a transmit processing section to be used for processing the at least data to be transmitted is one of either the 802.11b or the OFDM processing sections, wherein the transmit processing section is defined at least in part upon one or more attributes of the client wireless module and one or more attributes of the access point wireless module, wherein the one or more attributes of the access point wireless module include a sensitivity of a receiver of the access point wireless module, wherein the one or more attributes of the client wireless module include a sensitivity of a receiver of the client wireless module, wherein if the receiver of the client wireless module has a higher sensitivity than the sensitivity of the receiver of the access point wireless module, the 802.11g processing section is selected as the transmit processing section and, wherein if the receiver of the client wireless module has a lower sensitivity than the sensitivity of the receiver of the access point wireless module, the 802.11b processing section is selected as the transmit processing section.

8. The access point wireless module of claim 7, wherein the at least one transmit antenna comprises a plurality of transmit antennas.

9. The access point wireless module of claim 8, wherein the at least one receive antenna comprises a plurality of receive antennas.

10. An access point wireless module, for handling communications to and from a client wireless module, comprising:

an 802.11g processing section, for processing at least data to be transmitted to the client wireless module into representations of a transmit signal and for processing at least a representation of a receive signal from the client wireless module into receive data;

an 802.11b processing section, for processing at least a representation of a receive signal from the client wireless module into receive data and for processing at least data to be transmitted to the client wireless module into representations of a transmit signal;

at least one transmit antenna, coupled to the 802.11g processing section and to the 802.11b processing section;

at least one receive antenna, coupled to the 802.11b processing section and to the 802.11g processing section; and logic for routing information between an access point and the access point wireless module, wherein a receive processing section to be used for processing the at least a representative of a receive signal is one of either the OFDM processing section or the 802.11b processing sections, wherein the receive processing section is defined at least in part upon one or more attributes of the client wireless module and one or more attributes of the access point wireless module, wherein the one or more attributes of the access point wireless module include a transmitter strength of a transmitter of the access point wireless module, wherein the one or more attributes of the client wireless module include a transmitter strength of a transmitter of the client wireless module, wherein if the transmitter strength of the transmitter of the client wireless module has a higher transmitter strength than the strength of the transmitter of the access point wireless module, the 802.11g processing section is selected as the receive processing section, and wherein if the transmitter of the client wireless module has a lower transmitter strength than the transmitter strength of the access point module, the 802.11b processing section is selected as the receive processing section.

11. The access point wireless module of claim 10, wherein the at least one transmit antenna comprises a plurality of transmit antennas.

12. The access point wireless module of claim 10, wherein the at least one receive antenna comprises a plurality of receive antennas.

13. A method of wireless communication between a client device and an access point, wherein a client device is a wireless network station that is portable, mobile or portable and mobile, the method comprising:

transmitting upstream data from the client device using one of an 802.11b protocol or an 802.11g protocol;

receiving the upstream data at the access point;

transmitting downstream data from the access point using one of an 802.11g protocol or an 802.11b protocol in response to receiving the upstream data at the access point; and receiving the downstream data at the client device,
wherein upstream data is transmitted using a different protocol than downstream data, and wherein protocols are selected at least in part based upon one or more attributes of the client device and one or more attributes of the access point device,
wherein the one or more attributes of the access point device include a sensitivity of a receiver of the access point device and include a transmitter strength of a transmitter of the access point device,
wherein the one more attributes of the client device include a sensitivity of a receiver of the client device and include a transmitter strength of a transmitter of the client device,
wherein if the receiver of the client device has a higher sensitivity than the receiver of the access point device, the 802.11g protocol is selected for transmitting upstream data,
wherein if the receiver of the client device has a lower sensitivity than the receiver of the access point device, the 802.11b protocol is selected for transmitting upstream data,
wherein if the transmitter strength of the transmitter of the access point device has a higher transmitter strength than the strength of the transmitter of the transmitter of the client device, the 802.11g protocol is selected for transmitting downstream data, and
wherein if the transmitter of the access point device has a lower transmitter strength than the transmitter strength of the client device, the 802.11b protocol is selected for transmitting downstream data.

14. A client wireless module, for handling communications to and from an access point wireless module, comprising:
a first protocol processing section, for processing at least data to be transmitted to the access point wireless module into representations of a transmit signal using a first protocol from a plurality of protocols,
a second protocol processing section, for processing at least a representation of a receive signal from the access point wireless module into receive data using a second protocol from the plurality of protocols;
at least one transmit antenna, coupled to the first protocol processing section;
at least one receive antenna, coupled to the second protocol processing section;
logic for routing information between a client and the client wireless module; and
where in the first protocol and the second protocol are different protocols for wireless communication, and wherein the first protocol and the second protocol are selected at least in part based upon one or more attributes of the client wireless module and one or more attributes of the access point wireless module,
wherein the one or more attributes of the access point wireless module include a sensitivity of a receiver of the access point wireless module,
wherein the one or more attributes of the client wireless module include a sensitivity of a receiver of the client wireless module,
wherein if the receiver of the access point wireless module has a higher sensitivity than the sensitivity of the receiver of the client wireless module, a wireless communications protocol having a higher data rate is selected for the first protocol from the plurality of wireless communications protocols, and
wherein if the receiver of the access point wireless module has a lower sensitivity than the sensitivity of the receiver of the client wireless module, a wireless communications protocol having a lower data rate is selected for the first protocol from the plurality of wireless communication protocols.

15. A client wireless module of claim 14, wherein the one or more attributes of the access point wireless module include a transmitter strength of a transmitter of the access point wireless module,
wherein the one or more attributes of the client wireless module include a transmitter strength of a transmitter of the client wireless module,
wherein if the transmitter strength of the transmitter of the access point wireless module has a higher transmitter strength than the strength of the transmitter of the client wireless module, a wireless communications protocol having a higher data rate is selected for the second protocol from the plurality of wireless communications protocols, and
wherein if the transmitter of the access point wireless module has a lower transmitter strength than the transmitter strength of the client wireless module, a wireless communications protocol having a lower data rate is selected for the second protocol from the plurality of wireless communications protocols.

16. The client wireless module of claim 14, wherein the at least one transmit antenna comprises a plurality of receive antennas.

17. The client wireless module of claim 16, wherein the at least one receive antenna comprises a plurality of transmit antennas.

18. An access point wireless module for handling communications to and from a client wireless module, the access point wireless module comprising:
a first protocol processing section, for processing at least data to be transmitted to the client wireless module into representations of a transmit signal using a first protocol from a plurality of protocols;
a second protocol processing section, for processing at least a representation of a receive signal from the client wireless module into receive data using a second protocol form the plurality of protocols;
at least one transmit antenna, coupled to the first protocol processing section;
at least one receive antenna, coupled to the second protocol processing section;
logic for routing information between an access point and the access point wireless module; and
wherein the first protocol and the second protocol are different protocols for wireless communication, and wherein the first protocol and the second protocol are selected at least in part based upon one or more attributes of the client wireless module and one or more attributes of the access point wireless module,
wherein the one or more attributes of the access point wireless module include a sensitivity of a receiver of the access point wireless module,
wherein the one more attributes of the client wireless module include a sensitivity of a receiver of the client wireless module,
wherein if the receiver of the client wireless module has a higher sensitivity than the receiver of the access point wireless module, a wireless communications protocol having a higher data rate is selected for the first protocol from the plurality of wireless communications protocols, and wherein if the receiver of the client wireless module has a lower sensitivity than the receiver of the access point wireless module, a wireless communications protocol having a lower data rate is selected for the first protocol from the plurality of wireless communications protocols.

19. A client wireless module of claim 18, wherein the one or more attributes of the access point wireless module include a transmitter strength of a transmitter of the access point wireless module, wherein the one or more attributes of the client wireless module include a transmitter strength of a transmitter of the access client wireless module, wherein if the transmitter strength of the transmitter of the client point wireless module is higher than the transmitter strength of the transmitter of the access point wireless module, a wireless communications protocol having a higher data rate is selected for the second protocol from the plurality of wireless communications protocols, and wherein if the transmitter of the client wireless module has a lower transmitter strength than the transmitter of the access point wireless module, a wireless communications protocol having a lower data rate is selected for the second protocol from the plurality of wireless communications protocols.

20. The access point wireless module of claim 18, wherein the at least one transmit antenna comprises a plurality of transmit antennas.

21. The access point wireless module of claim 20, wherein the at least one receive antenna comprises a plurality of receive antennas.

22. A method of wireless communication between a client device and an access point, wherein a client device is a wireless network station that is portable, mobile or portable and mobile, the method comprising:

transmitting upstream data from the client device using a first protocol from a plurality of protocols;

receiving the upstream data at the access point;

transmitting downstream data from the access point using a second protocol from the plurality of protocols in response to receiving the upstream data at the access point;

receiving the downstream data at the client device; and wherein the first protocol and the second protocol are different protocols for wireless communication, and wherein the first protocol and the second protocol are selected at least in part based upon one or more attributes of the client device and one or more attributes of the access point device, wherein the one or more attributes of the access point device include a sensitivity of a receiver of the access point device, wherein the one more attributes of the client device include a sensitivity of a receiver of the client device, wherein if the receiver of the client device has a higher sensitivity than the receiver of the access point device, a protocol having a higher data rate is selected for the first protocol from the plurality of protocols, and wherein if the receiver of the client device has a lower sensitivity than the receiver of the access point device, a protocol having a lower data rate is selected for the first protocol from the plurality of protocols.

23. A method of wireless communication of claim 22 further comprising, wherein the one or more attributes of the access point device include a transmitter strength of a transmitter of the access point device, wherein the one or more attributes of the client device include a transmitter strength of a transmitter of the client device, wherein if the transmitter strength of the transmitter of the access point device has a higher transmitter strength than the strength of the transmitter of the client device, a protocol having a higher data rate is selected for the second protocol from the plurality of protocols, and wherein if the transmitter of the access point device has a lower transmitter strength than the transmitter strength of the client device, a wireless communications protocol having a lower data rate is selected for the second protocol from the plurality of protocols.

* * * * *